Feb. 28, 1956 P. SCHAGEN 2,736,767
TELEVISION AMPLIFIER CIRCUIT
Filed Aug. 22, 1950
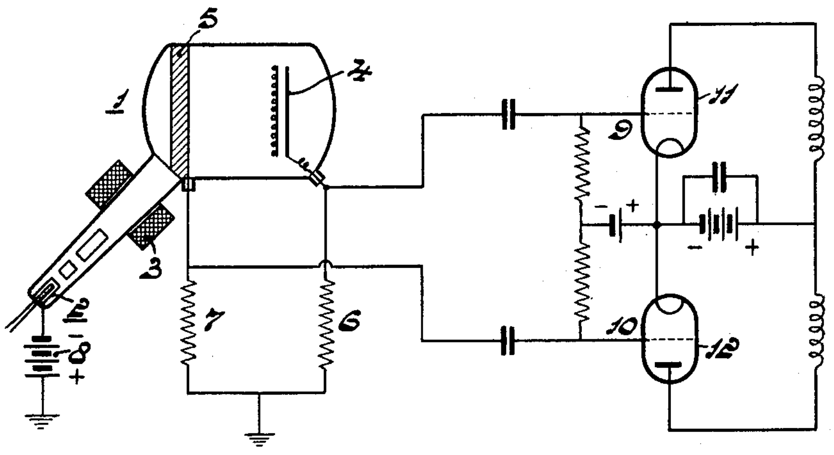
INVENTOR.
PIETER SCHAGEN
BY Fred M. Vogel
AGENT United States Patent Office 2,736,767

Patented Feb. 28, 1956

2,736,767

TELEVISION AMPLIFIER CIRCUIT

Pieter Schagen, Eindhoven, Netherlands, assignor to Hartford National Bank and Trust Company, Hartford, Conn., as trustee Application August 22, 1950, Serial No. 180,745

Claims priority, application Netherlands September 3, 1949

3 Claims. (Cl. 178—7.2)

The present invention relates to circuit-arrangements for amplifying the output signal of television camera tubes.

In such arrangements, it is common practice to supply the output voltage developed across a resistor included in an output circuit of the camera tube to the control grid circuit of an amplifying tube.

In order to obtain a maximum input voltage for this amplifying tube, the aforesaid output resistor must have a maximum value. However, for high frequency signals, the output impedance of the camera tube, when the said resistor is given a high value, is determined in large measure by the parasitic capacity between the grid and the cathode of the amplifying tube. As a result, the input voltage of the amplifying tube for the said frequencies will not increase in proportion with an increase in the value of the said resistor. Since the signal to noise ratio is substantially determined in the first amplifying stage, the signal to noise ratio at high frequencies is not improved by increasing the value of the said resistor.

The principal object of the present invention is to provide an amplifier circuit in which this disadvantage is overcome.

More particularly, it is an object of the invention to provide an amplifier for a television camera tube in which a high signal to noise ratio may be achieved despite the pressure of high frequency signal components.

Further objects of the invention will appear from the following description.

The circuit arrangement according to the invention is characterized in that it comprises two discharge tubes connected in push-pull, each of the control grids of the tubes being controlled by a respective one of two voltages of opposite phase which are derived from two output electrodes of the television camera tube.

The invention makes successful use of the fact that two electrodes are contained in the camera tube from which two voltages of opposite phase may be derived. These are, for example in the case of the iconoscope and the image iconoscope, the signal plate located behind the mosaic and the collector electrode to which the secondary electrons released in scanning the mosaic flow off.

If identical resistances are included in the output circuit of the said two electrodes, two signals of substantially equal amplitude are produced at these electrodes.

By supplying the said signal voltages to a push-pull amplifier, the available signal is increased by a factor of 2, whereas the noise which is divided over the two tubes connected in push-pull is only increased by a factor of $\sqrt{2}$.

The invention will now be explained more fully by reference to the accompanying drawing showing diagrammatically, by way of example, one embodiment of the circuit-arrangement according to the invention.

A television camera tube 1, which is constructed as an iconoscope, comprises an electron gun including a cathode 2 and means (not shown) for generating and focussing the cathode-ray beam deflection coils 3, a mosaic with signal plate 4, and a collector electrode 5.

The signal plate 4 and the collector electrode 5 are connected to ground through a pair of resistances 6 and 7 respectively. The cathode 2 of the iconoscope is connected to the negative terminal of a high voltage supply 8, the positive terminal of which is connected to ground.

The two signal voltages of opposite phase which are developed across the resistances 6 and 7 are supplied to control grids 9 and 10 respectively of discharge tubes 11 and 12. Tubes 11 and 12 are coupled in push-pull relationship. Further amplifying stages may be connected in known manner in series with the said push-pull circuit.

In a preferred embodiment of the invention, a camera tube in which the two output signal voltages have equal values when using identical output resistances is employed. When using other tubes, for example, camera tubes of the image-orthicon type in which the electrons returning in the tube are usually supplied to an electron multiplier, the circuit-arrangement according to the invention may also be used if the two resistances included in the output circuits are given resistance values inversely proportional to the electron currents flowing to the said output circuits.

While the invention has been described in a specific use thereof and in a specific embodiment, it is not desired that it be limited thereto, for obvious modifications will occur to those skilled in the art without departing from the spirit and scope of the invention.

What I claim is:

1. An amplifier circuit arrangement, comprising a television camera tube having first and second output electrodes, first and second electron discharge systems coupled in push-pull arrangement each having an input circuit and an output circuit, means to derive a first signal voltage having a first given phase from one of said output electrodes of said camera tube, means to derive a second signal voltage having a second given phase substantially in phase opposition to said first given phase from the other of the output electrodes of said camera tube, and means to apply each of said first and second signal voltages to a respective input circuit of said electron discharge systems to develop an amplified signal voltage in said output circuits of said electron discharge systems.

2. An amplifier circuit arrangement, comprising a television camera tube having a signal plate and a collector electrode, first and second electron discharge tubes coupled in push-pull arrangement each having an input circuit and an output circuit, means to derive a first signal voltage having a first given phase from said signal plate of said camera tube, means to derive a second signal voltage having a second given phase substantially in phase opposition to said first given phase from said collector electrode of said image camera tube, and means to apply each of said first and second signal voltages to a respective input circuit of said electron discharge tubes to develop an amplified signal voltage in said output circuits of said electron discharge tubes.

3. An amplifier circuit arrangement, comprising a television camera tube having a signal plate and a collector electrode, first and second electron discharge tubes coupled in push-pull arrangement each having an input circuit and an output circuit, means comprising a first resistance element coupled to said signal plate to derive a first signal voltage having a first given phase from said signal plate, means comprising a second resistance element coupled to said collector electrode to derive a second signal voltage having a second given phase substantially in phase opposition to said first given phase from said collector electrode, and means to apply each of said first and second signal voltages to a respective input circuit of said electron discharge tubes to develop an amplified signal voltage in said output circuits of said electron discharge tubes.

References Cited in the file of this patent

UNITED STATES PATENTS

| | | |
|---|---|---|
| 2,182,578 | Blumlein et al. | Dec. 5, 1939 |
| 2,213,547 | Iams | Sept. 3, 1940 |
| 2,309,744 | Bedford | Feb. 2, 1943 |
| 2,355,110 | Rosenthal | Aug. 8, 1944 |
| 2,470,240 | Crosby | May 17, 1949 |
| 2,534,627 | Schade | Dec. 19, 1950 |
| 2,585,008 | Hallmark | Feb. 12, 1952 |